C. A. SCHOONMAKER.
FLYING MACHINE.
APPLICATION FILED APR. 24, 1911.
1,020,718.
Patented Mar. 19, 1912.
4 SHEETS—SHEET 1.
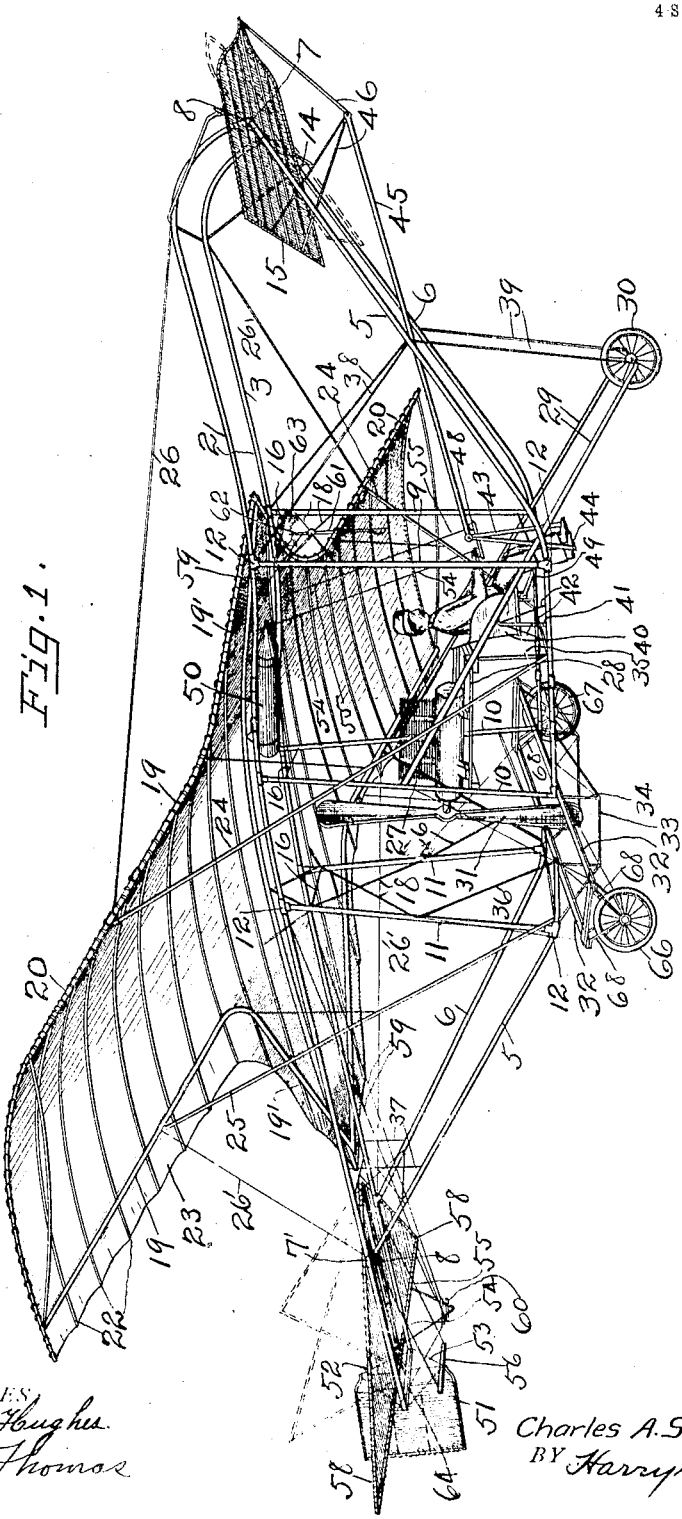
WITNESSES
Chas H Hughes
A C Thomas
INVENTOR.
Charles A. Schoonmaker
BY Harry D Wallace
ATTORNEY.

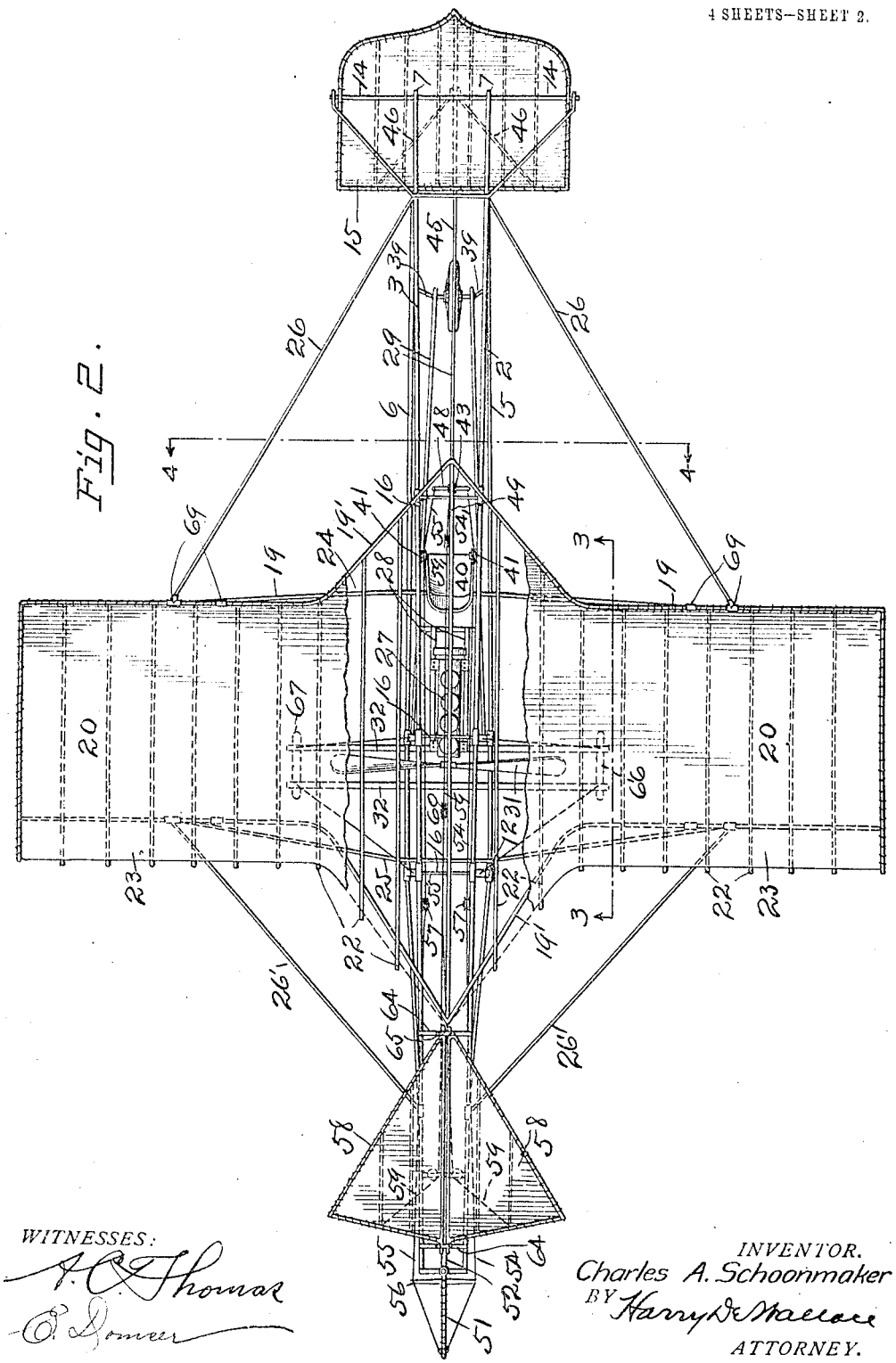

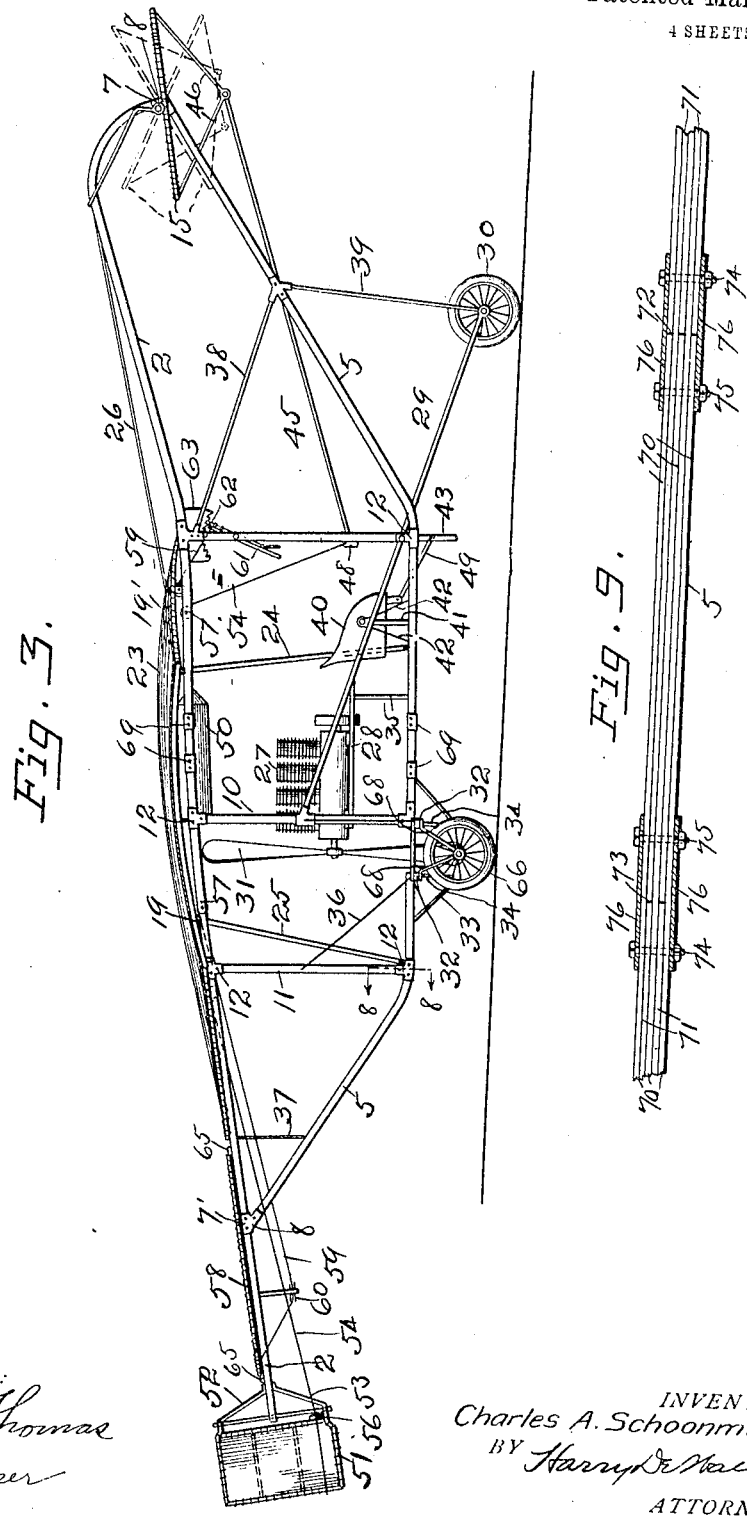

C. A. SCHOONMAKER.
FLYING MACHINE.
APPLICATION FILED APR. 24, 1911.
1,020,718.
Patented Mar. 19, 1912.
4 SHEETS—SHEET 4.
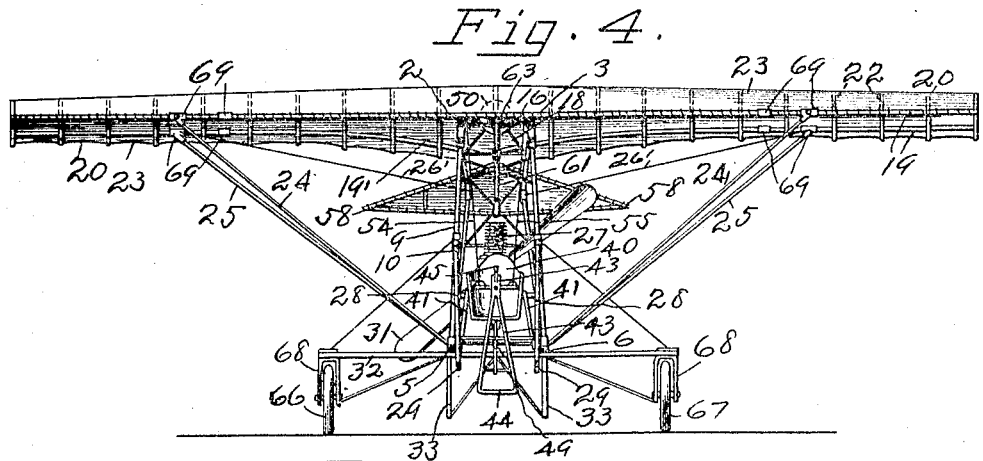
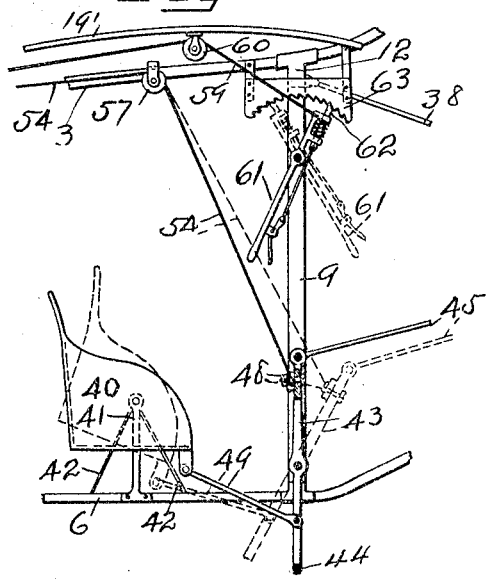
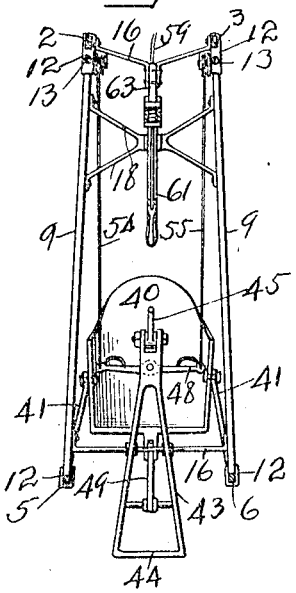
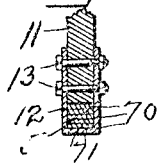
WITNESSES:
INVENTOR.
Charles A. Schoonmaker
BY
ATTORNEY.

UNITED STATES PATENT OFFICE.

CHARLES A. SCHOONMAKER, OF SYRACUSE, NEW YORK, ASSIGNOR, BY DIRECT AND MESNE ASSIGNMENTS, OF ONE-HALF TO EDWARD J. RYAN, OF SYRACUSE, NEW YORK.

FLYING-MACHINE.

1,020,718.　　　　Specification of Letters Patent.　　Patented Mar. 19, 1912.

Application filed April 24, 1911.　Serial No. 622,885.

*To all whom it may concern:*

Be it known that I, CHARLES A. SCHOON-MAKER, a citizen of the United States, residing at Syracuse, in the county of Onondaga and State of New York, have invented certain new and useful Improvements in Flying-Machines, of which the following is a specification.

This invention relates to improvements in flying machines, designed for navigating the air, and the invention relates particularly to a flying machine of the heavier-than-air type, known as monoplane, which is propelled by a motor or other like source of power.

The object of the invention is to provide a monoplane which is simple, strong, effective and durable, in which the weight of the frame, motor and aviator are all located below the level of the plane, in position to perfectly balance the machine while in flight, thus obviating the use of side controllers or like devices.

A further object is to provide novel and simple means for steering and controlling the machine.

The various features and parts of the invention will be understood from the detailed description which follows, and by reference to the accompanying drawings, which form a part of this specification, and in which—

Figure 1 is a perspective view of the complete machine; showing the same as it appears when in flight. Fig. 2 is a top plan view, with portions of the canvas of the main plane broken away, to show location and arrangement of certain of the working parts of the machine. Fig. 3 is a side elevation and part section of the machine standing on the ground. Fig. 4 is a vertical cross section taken on line 4—4 of Fig. 2. Fig. 5 is an enlarged detail side view of the seat and mechanisms for operating the head and tail controllers. Fig. 6 is an enlarged front view of the parts shown in Fig. 5. Fig. 7 is a detail plan view of the rear controllers. Fig. 8 is a sectional view taken on line 8—8 of Fig. 3. Fig. 9 is an enlarged view of one of the splice-joints.

Similar characters of reference are assigned to corresponding parts throughout the several views.

In the drawings, illustrating my improved aeroplane, 2 and 3 represent like top frame sections or rails, which are preferably made of laminated wood, and are disposed substantially parallel to each other. The frame pieces 2 and 3 extend unbroken from the head to the tail of the machine, and at intervals are rigidly spliced, in the manner shown by the detail view Fig. 9. 5 and 6 represent like bottom frame rails or parts, also made of laminated wood, the opposite ends of these frame parts are bent or inclined upwardly and connect with the frame rails 2 and 3 at 7 and 7', where suitable metallic clamps or attaching parts 8, and bolts or screws may be employed for securing the parts together. The rails 5 and 6 connect intermediate their ends to the top sections 2 and 3, by means of a series of upright posts or struts 9, 10 and 11, arranged in pairs and which are also preferably constructed of laminated wood. These posts are secured to the frame rails by means of U-shaped metallic stirrups or clamps 12, which grip the rails, and their ends are perforated to receive bolts or screws 13 for securing them to the posts. (See Fig. 8.) The head or forward ends of the frame sections 2, 3, 5 and 6 are held together by a rod 14, which serves as the pivot for a rocking elevator plane 15, which is employed for controlling the head of the machine. The struts or posts 9, 10 and 11 are held rigidly in their spaced positions by cross-braces 16, which are preferably made of tubing bent U-shaped, and their ends are secured to the posts by bolts or screws in the usual manner. The upper ends of each pair of posts are further braced by means of angular pieces of tubing 18, which are rigidly secured to the posts.

The main plane of the machine consists of an irregular frame 19, also made of laminated wood, having a diamond-shaped central portion 19', and like integral lateral wings 20, 20 all of which are mounted upon the top frame rails and are secured thereto by suitable metallic clamps, (not shown).

22, 22 represent a series of ribs arranged longitudinally and secured to the top of the frame 19 of the main plane. These ribs are preferably made of laminated wood and bent to give a crown or convex effect to the entire plane, and a sheet or web of canvas 23 is then secured to the tops of the several ribs. The lateral wings 20, of the plane are tied to the bottom frame sections 5 and 6, by means of angular braces or guys 24 and 25, preferably made of wood like the other parts, and the main plane is also connected to the head and tail portions of rails 2 and 3, by brace or guy wires 26 and 26'.

The machine is driven or propelled by a motor or engine 27, which may be of any suitable construction or make. The motor is mounted upon horizontal timbers or girders 28, which are secured to the posts 10, and also to a pair of inclined braces or shafts 29, which are supported by the posts 9 and 10. The free ends of the braces 29 project forwardly to a point lower than the bottom of the main frame of the machine, for supporting a front wheel 30, employed for trundling the machine over the ground.

31 represents the propeller wheel which is carried by the motor, and by which the machine is driven over the ground, and also through the air. To provide a suitable pit for the propeller, whose diameter is greater than the distance between the top and bottom frame rails, the bottom rails 5 and 6 are cut away between the struts 10 and 11, and the opposite severed ends of the frame are supported and tied together by means of cross-timbers 32, 32, which may be rigidly secured to the frame rails in any suitable manner. To hold the frame from spreading longitudinally, truss-braces 33 are secured to the opposite undersides of the frame, and these are connected to the cross-timbers 32 by means of depending brace-rods 34. To further stiffen the lower portions of the frame and to hold the rails 5 and 6 from shifting or spreading out of line or position, braces 35 and 36 are provided. The former extending vertically from said rails to the front wheel shafts 29; the latter arranged at an angle between the said rails and the posts 11, as shown in Figs. 1 and 3. The lower frame parts 5 and 6 near their rear ends are tied to the top rails 2 and 3 by braces 37, and near their forward ends they are tied to the posts 9 by rods 38. The front wheel supports 29 are braced and made rigid by means of rods 39, which extend vertically and connect to the rails 5 and 6.

The aviator sits in a swinging chair or seat 40, positioned directly in front of the motor, and is pivotally supported by upright standards 41, which are mounted upon the bottom rails 5 and 6, and these are braced by angular rods 42. The chair 40 is intended to swing only in the direction of the length of the machine like a pendulum.

43 represents a rocking lever, which is pivotally mounted on the lower cross-brace 16 between the struts 9. This lever comprises an open frame having a cross-bar 44 at its lower end for supporting the aviator's feet, and also to afford means for pedaling the lever at certain times, when his hands are otherwise engaged. The lever 3 is employed for operating the elevator plane 15, for controlling the head of the machine, and connects with said plane by means of a rod 45, which is pivoted at its rear end to the top of lever 43, its forward end connecting to angular rods 46, which are secured to the plane 15. The forward and backward swinging of the lever 43, either by hand through a cross-bar 48, or by the feet through the pedal bar 44, effects the shifting or tilting of the elevator plane, to and from the several positions, as shown by the full and dotted lines in Figs. 1 and 3, for effecting the elevation or lowering of the head of the machine. The middle position shown by full lines in Fig. 3 indicates the normal position of the elevator plane 15 while the machine is sailing through the air. The dotted lines in Fig. 3 indicate the positions of the elevator plane for rising or descending. The chair 40 is also connected to the lever 43 by means of a jointed rod 49. The arrangement of the connection between the chair and lever 43 is such that, the aviator may, whenever desirable or necessary, shift the elevator plane 15, to any of the positions shown, by simply swaying his body and correspondingly tilting the chair. In any event, the chair 40 and the lever 43 always move forward and backward relatively, and in this manner the aviator may control the head of the machine by the weight and movement of his body, thus leaving his hands and feet free for the controlling of other parts of the machine, or for attending to the engine. The engine or motor 27 may be supplied with fuel oil which is carried in a tank 50, which is hung overhead centrally between the top frame sections 2 and 3.

The rear controller for steering the machine comprises a rudder 51, which is arranged vertically, and adapted to be swung laterally in opposite directions for guiding or steering the course of the machine. The rudder is pivotally mounted between tubular braces or standards 52 and 53, which are secured to the rear ends of the top sections 2 and 3 of the frame. The rudder is manipulated or shifted in the opposite directions by ropes or wires 54 and 55, which connect to the rudder by means of a cross-bar 56. These wires then extend forwardly along and between the rails 2 and 3, and are held in place at intervals by pulleys 57, and the forward ends of the wires are attached to the cross-bar 48 carried by the lever 43. Rocking the cross-bar 48 in opposite directions swings the rudder from right to left and vice versa.

To further control the rear end of the machine, particularly for maintaining this portion of the machine at the proper level during flight, I provide a pair of tiltable wings or planes 58, preferably triangular in plan, which are normally held in substantially horizontal position upon the top rails 2 and 3 of the frame, by means of wires or ropes 59, which are connected to the planes, and then extend forwardly over a number of pulleys 60, and connect to a depending hand-lever 61, which is pivotally disposed between the struts or posts 9, being supported by one of the cross-braces 16. The lever 61 is fitted with a spring-controlled latch or bolt 62, the upper end of the bolt being arranged to engage a toothed quadrant or part 63, which is mounted between the top rails 2 and 3 of the frame, for locking and holding the planes 58 in horizontal position, which is the normal flying position of these planes. The planes 58 are pivoted to cross-parts 64 of the frame by clips 65, best seen in Fig. 7, which permit the planes to tilt from the position shown in full lines, to that shown in dotted lines in Fig. 1.

As explained, the planes 58 are normally held in horizontal position during the time the machine is in flight, but when the machine is about to alight on the ground, the aviator releases the latch 62 carried by the hand-lever 61, and swings the said lever forwardly (see dotted lines Fig. 5), which slackens the wires 59, and allows the planes or wings 58 to tilt upwardly, by the force of the gravitation of the machine, for permitting the rear end or tail of the machine to approach the ground more rapidly than the head. Under this arrangement, when the machine descends to the ground, the rear wheels 66 and 67 strike the ground first, and then the head of the machine will settle down gently until the front wheel 30 meets the earth. The rear wheels are mounted between and slightly below the cross-timbers 32, and are held rigidly in place by depending braces 68, which are secured to the underside of said timbers; the wheels being pivoted to the said braces in the usual manner.

69 represents a number of splice-joints, which occur at intervals in the frame rails 2, 3, 5 and 6, as well as, in the frame 19 of the main plane.

All of the wooden parts of the machine are laminated, or built up of a number of thin strips or layers of wood, as 70 and 71, which are then preferably glued or cemented together, to form strong and stiff, yet somewhat flexible parts. Fig. 9 illustrates the method of constructing the laminated parts, and also the manner in which the splices are arranged. To prepare the rails for splicing, the strips 70 of one end of the rail are cut away at 72, and the strips 71 are cut away at 73, the opposing ends are then brought together, the alternate strips interfitting, as shown in Fig. 9. After the ends of the rails are interlocked, they are perforated to receive bolts 74 and 75, which also pierce clamping plates 76 for tightly clamping and holding the parts together. To break the splice, it is only necessary to remove the bolts 75 which pass through the alternating strips from the opposing ends of the rail. These splices serve the twofold purpose, of facilitating the construction of a continuous unbroken frame, and also permitting the knocking-down of the machine for transportation or storing.

The monoplane herein shown and described is extremely simple, and all of its parts are constructed and arranged with reference to producing a safe and practical flying machine.

Practically the entire weight of the machine is disposed centrally and below the level of the main plane, which insures a perfect balancing of the device while in flight, and enables the operator to control the machine with greater ease and safety than any other machine of the class known to me.

The mechanism or means for controlling the head and tail of the machine are simple, and these are all disposed within easy reach of the aviator, who may with but a few movements and slight exertion readily direct and control the entire machine from his seat, which also is arranged to coöperate for operating certain of the controlling means. The main plane is disposed directly over the heaviest parts of the device, and this contributes to the perfect balancing of the whole machine.

The rails and struts of the frame, and the frames and ribs of the planes all being constructed of laminated wood, impart to the whole structure of the machine the requisite strength, and at the same time, each part, as well as the whole skeleton when assembled and properly joined together, has sufficient flexibility to render the machine buoyant and wieldy, and capable of being safely driven through the air and properly controlled at all times.

Obviously some changes or modifications may be made in the parts within the scope defined by the appended claims, without departing from the spirit of my invention, and I therefore do not restrict myself to the precise construction, arrangement and operation as herein shown and described.

Having thus described my invention, what I claim as new and desire to secure by Letters Patent, is—

1. In a flying machine, a frame comprising top and bottom laminated wooden rails, laminated wooden posts connecting the top and bottom rails, a main plane mounted on top of the frame having a laminated wooden frame and like wooden ribs, a pair of laminated wooden braces for connecting the lateral portions of the said plane to each of the bottom rails, and splice-joints in said rails and also in the frame of the main plane for rendering said parts sectional.

2. In combination, an elongated open frame comprising top and bottom rails built-up of laminated wood, and a series of like wooden posts for connecting the middle portions of said rails, a rigid main plane supported by the top rails of the frame, a pair of braces for connecting the lateral portions of the plane to the bottom rails of the frame, means for controlling the head of the frame, and a plurality of splice-joints for rendering the top and bottom rails and also the main plane sectional for storing and shipping.

3. In combination, an elongated frame comprising top and bottom rails, a series of posts for connecting the corresponding top and bottom rails, cross braces for connecting the top, and also, the bottom rails, a main plane mounted upon the top rails of the frame, an elevator plane pivoted to the head of the frame, a pair of tiltable tail planes, all of said planes being normally disposed and held substantially in a common horizontal position, means for manually operating the elevator plane, and means for releasing said tail planes for permitting the automatic tilting thereof at the end of each flight.

4. In combination, an elongated frame, a single main plane rigidly mounted upon the frame midway between the head and tail thereof, an elevator plane pivoted to the head of the frame, a pair of oppositely disposed tilting planes mounted on the tail of the frame, all of said planes being normally disposed in a substantially common horizontal plane, means for rocking said elevator plane, means for holding said tilting planes in horizontal position while the machine is in flight, and means for releasing said tilting planes for allowing the tail of the frame to approach the ground in advance of the head.

5. A flying machine, comprising an elongated frame, consisting of parallel top and bottom sections, front and rear wheels for supporting the frame on the ground, a main plane mounted transversely upon the top sections of the frame substantially midway in the length of said sections, an elevator plane pivotally disposed at the head of the machine at the juncture of the top and bottom sections, means for operating said elevator plane, a pair of tilting tail planes capable of being rigidly held in horizontal position upon the top sections of the frame while the machine is in flight, and adapted to be tilted by air pressure when released as the machine approaches the ground for allowing the rear wheels to engage the earth in advance of the front wheel, and a motor supported by the bottom sections of the frame for propelling the machine.

6. A flying machine of the mono-plane type, comprising an elongated open frame of laminated wood, a main plane transversely disposed across the top of the frame and rigidly secured thereto, means for propelling the machine, said means disposed below the level of the main plane, an elevator plane pivoted to the head end of the frame, a rocking seat mounted in the frame below the level of the main plane adapted for carrying the aviator, a lever pivoted to the frame within reach of the aviator when sitting in the seat, said lever connected to the elevator plane, and also to the seat, adapted to be rocked forward or backward either by the aviator's hands or feet, or by the swaying of his body in the seat, for shifting the elevator plane for controlling the head of the machine, a pair of triangular planes pivoted near the rear end of the frame, a hand-lever pivoted to the frame adjacent the aviator's seat, and a wire connecting said rear planes to said hand-lever, whereby said planes may be operated for controlling the tail of the machine.

7. A flying machine consisting of an elongated sectional frame, having like top and like bottom rails, each set of rails arranged substantially parallel to each other, the corresponding top and bottom rails connected directly to each other at the head and also near the tail of the machine, a series of struts for holding the middle portions of said rails apart vertically, a series of cross-braces for holding said rails apart horizontally, U-shaped clamps for connecting the struts to the rails of the frame, a main plane mounted at right angles across the top rails of the frame and rigidly connected thereto, a motor and a propeller-wheel for driving the machine, the motor mounted substantially in the center of the frame and also centrally with the main plane but below the level of the said plane, a rocking plane pivoted to the head of the machine, a chair for the aviator, said chair pivotally mounted on the bottom rails of the frame, said chair connected with the rocking plane and adapted when tilted forward or backward to shift the rocking plane for controlling the head of the machine, a pair of tiltable planes for controlling the tail of the machine, and a rudder for steering the course of the machine.

8. In a flying machine, an elongated frame, comprising top and bottom laminated wooden rails, laminated wooden posts, and tubular braces, a main plane mounted on top of the frame, having a laminated wooden frame and like wooden ribs, said plane having a relatively large diamond-shaped middle portion disposed over the middle of the frame, and having integral lateral wings projecting at each side of the frame, said wings guyed to the bottom rails by laminated wooden braces, a series of splice-joints in the said rails and also in the frame of the main plane for rendering the machine sectional for storing and shipping, a controller for the head of the machine, supported by the top and bottom rails, means for operating said controller, a plurality of controllers for the tail of the machine, means for operating the tail controllers, and a motor and propeller wheel for driving the machine over the ground and through the air.

9. In combination, an elongated frame, a single main plane mounted on top of the frame at right angles thereto, an elevator plane pivoted to the head of the frame, a pair of tiltable planes mounted on the tail of the frame and normally held in horizontal position while the machine is in flight, and means for releasing said tiltable planes for allowing the tail of the frame to approach the ground in advance of the head at the close of each flight.

In testimony whereof I affix my signature in presence of two witnesses.

CHARLES A. SCHOONMAKER.

Witnesses:
WM. C. ANDERSON,
HARRY DE WALLACE.